United States Patent [19]
Green et al.

[11] 3,864,083
[45] Feb. 4, 1975

[54] CARBON DETECTION

[75] Inventors: Norman W. Green, Lake Hiawatha;

[73] Assignee: Exxon Research and Engineering Company, Linden, N.J.

[22] Filed: June 26, 1970

[21] Appl. No.: 50,108

[52] U.S. Cl............ 23/230 PC, 23/253 PC, 48/214, 324/65 R, 324/71 R
[51] Int. Cl. ... C01b 2/14, G01r 27/02, G01n 27/04
[58] Field of Search .......... 48/214; 23/230 PC, 253, 23/212; 324/65, 71

[56] References Cited
UNITED STATES PATENTS

| | | | |
|---|---|---|---|
| 2,984,542 | 5/1961 | Kleiber | 23/230 PC |
| 3,414,382 | 12/1968 | Kapff et al. | 23/230 PC |
| 3,540,868 | 11/1970 | Chevion et al. | 48/214 |

*Primary Examiner*—R. E. Serwin
*Attorney, Agent, or Firm*—Joseph J. Dvorak

[57] ABSTRACT

A method for continuously detecting carbon deposition in a catalyst bed. Hence, processes involving reactions of carbonaceous materials can be controlled with reference to carbon deposited, thereby avoiding catalyst deterioration and loss of catalyst activity.

9 Claims, 2 Drawing Figures

INVENTORS
NORMAN WAYNE GREEN
RICHARD W. DUNNING
BY
ATTORNEY

CARBON DETECTION

BACKGROUND OF THE INVENTION

This invention relates to a method for detecting carbon deposition in catalyst beds. More particularly, this invention relates to a method for detecting carbon deposition on catalysts utilized in processing carbonaceous materials in sufficient time to control process variables to prevent inactivation and deterioration of the catalyst and plugging of the reactor by coking.

There are many chemical processes in which hydrocarbons or other carbonaceous materials are contacted with catalyst particles in processing units. Typical of such processes are steam reforming, town gas manufacturing, synthesis gas production, and hydrogen generation processes.

In the normal operation of a steam reforming process, for example, a hydrocarbon such as petroleum naphtha, gas oils, natural gas, methane, etc. is mixed with water or steam and passed through reactor tubes containing reforming catalyst at high temperatures. The hydrocarbon and steam react in the case of methane, for example, to produce hydrogen, carbon monoxide and carbon dioxide according to the following equations:

(1) $CH_4 + H_2O \rightarrow 3H_2 + CO$ (2) $CO + H_2O \rightarrow H_2 + CO_2$

Sometimes these processes are accompanied by side reactions in which carbon deposits, often called coke, are found and accumulate on the catalyst particles. If deposition of carbon on the catalyst occurs and is allowed to go uncontrolled, severe deactivation and deterioration of the catalyst results. Deteriorated or disintegrated catalyst, along with coke, can interfere with the desired flow of reactants by plugging the reactor.

To effective avoid catalyst deterioration and deactivation in these processes, it is necessary to be able to detect coking of the catalyst at the very early stages of coke formation. Then, process variables can be adjusted to at least slow down further deposition of coke, if not to remove coke already formed.

Unfortunately, present methods for detecting formation of coke on catalysts are not entirely suited to give sufficiently early warning so that reaction conditions can be adjusted accordingly.

For example, one method for determining whether coke is being formed in the catalyst is to remove a sample of the catalyst from the bed. The sample then is subjected to standard combustion techniques for determining the presence of carbon. Obviously, this method, while accurate, is discontinuous, time-consuming and impractical from the processing line point of view.

Sometimes the pressure drop across the catalyst is relied upon as an indication of coking. Generally with this method, coking is detected only after permanent damage to the catalyst has occurred.

A more sophisticated technique that permits continuous monitoring of carbon deposition is described in co-pending application Ser. No. 694,361, filed Dec. 29, 1967, now U.S. Pat. No. 3,540,868. That application teaches the coke formation can be detected by either measuring the electrical resistance of a single catalyst placed within a catalyst bed or by measuring the resistance of the entire bed by means of a probe that extends axially throughout the full length of the bed. While monitoring the electrical resistance of catalyst offers a considerable advance over the prior art, nonetheless, the suggested techniques have some disadvantages. For example, measuring the electrical resistance of an entire bed of catalyst is not a sufficiently responsive or sensitive technique that will provide adequate early warning of coke formation that can be readily remedied by adjustment of reaction or process variables. Indeed, if extensive catalyst deterioration has occurred throughout the bed, as a practical matter, control over the process is lost. On the other hand, measuring the electric resistance of a single catalyst pellet to detect coke formation is subject to considerable error depending upon the exact placement of the pellet in the catalyst bed and depending upon whether the pellet is likely to deviate from the norm by virtue of some defect or impurity incorporated during its preparation. Additionally, if a single detector catalyst pellet disintegrates the process can no longer be monitored no matter what the condition of the rest of the catalyst bed.

SUMMARY OF THE INVENTION

The present invention overcomes the deficiencies of the prior art and provides a method for continuously monitoring catalytic hydrocarbon processing reactions to detect carbon deposition early enough whereby processing variables are adjusted to controlled to prevent further carbon deposition and even to remove carbon already deposited. According to this invention, the conductance, or electrical resistance, of the catalyst is monitored over a distance within the bed sufficient to encompass the region where incipient coking occurs. By continuously measuring the conductance of the catalyst in the region of incipient coking, any change in the conductance of the catalyst in that region due to coke formation is readily detected before coke deposition has progressed throughout the entire reactor. Thus, process variables are adjusted in sufficient time to remove deposited coke and prevent inactivation and deterioration of the catalyst.

In a preferred embodiment of the invention, the conductance of a catalyst bed is monitored over about the first 2½ feet of the catalyst bed that is at activation temperatures and process variables are adjusted in response to changes in conductance.

DESCRIPTION OF THE PREFERRED EMBODIMENTS

The invention will be better understood by reference to the figures and specific examples.

Figure 1:
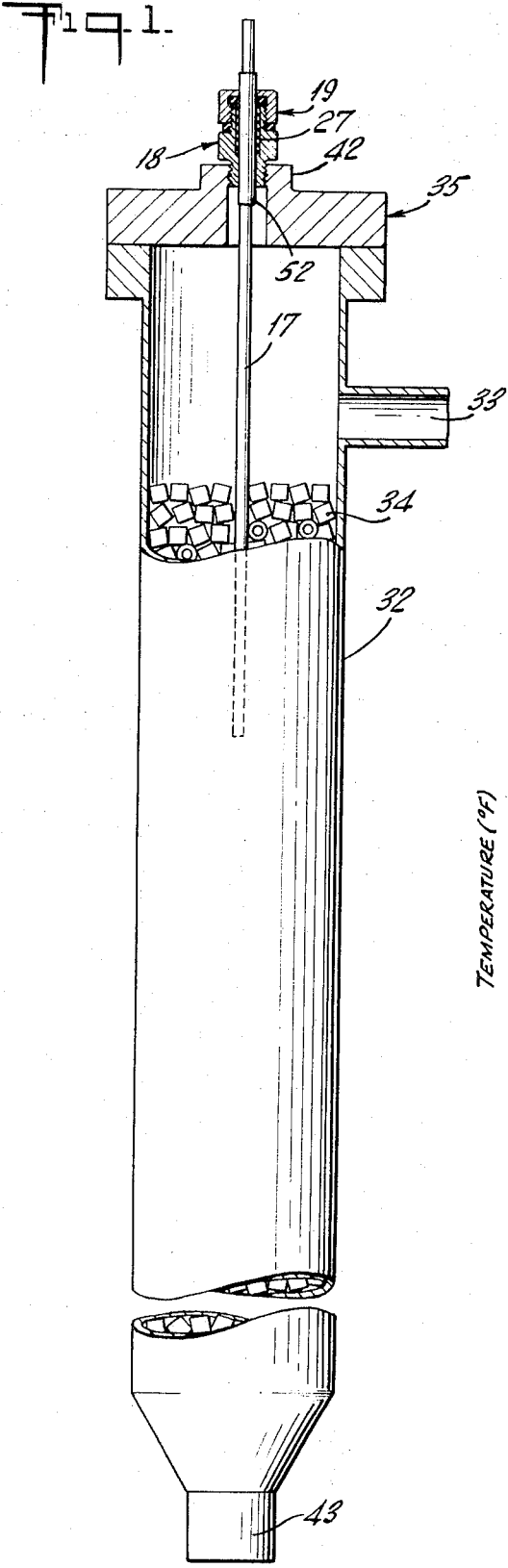
FIG. 1 is a side elevation partly in section and partly cut away of a reactor tube containing a catalyst and an electrode according to a preferred embodiment of the invention.

Referring to FIG. 1, a catalyst charge 34 is contained within an elongated electrically conductive reactor or tube, 32, which is provided with an inlet 33 and an outlet tube 43. Within top 35 of reactor 32 is provided an opening through which electrode 17 extends. Reactor top 35 is fitted with a half coupling 42 for receiving coupling 18 of the electrode assembly. Electrode 17, by virtue of insulation 52, and sealant 27 is not in electrical contact with coupling 18 and therefore reactor 32.

Swage member 18 completes the electrode assembly shown.

In the practice of the present invention, it is essentiall that electrode 17 extend into the region of incipient coking. The region of incipient coking is that area within the catalyst bed where the catalyst is at activation temperature. Generally in this region active catalyst borders on a zone of inactive catalyst.

The precise region of incipient coking can be determined from a gas temperature profile for any given reaction. To illustrate, a gas temperature profile for a typical reaction was determined by measuring centerline gas temperatures with thermocouple probes. The reactor was 3½ inches I.D. stainless steel reformer tube. The tube was charged with ⅝ inch Raschig rings of a commercial nickel alumina steam reforming catalyst containing about 25% nickel. A section of the tube, approximately 10 feet long, was filled with the catalyst rings. A mixture of propane and steam was preheated to about 950°F. and introduced into the tube which was heated in a furnace to maintain an outlet temperature of about 1,200°F. and to supply heat for the endothermic reforming operation. Specific operating conditions were the following:

| | |
|---|---|
| Inlet Temperature | 942°F. |
| Outlet Temperature | 1227°F. |
| Outlet Pressure | 350 psig |
| Steam/Carbon | 5.0/l |
| Mass Velocity | 2.45 lbm/ft² sec. |

Activation of the catalyst was achieved by introducing the propane steam mixture in the reactor at process inlet conditions and allowing the cracked hydrogen from the hydrocarbon to reduce the catalyst. Reaction was substantiated by chromatographic analysis of the effluent gas stream. The resulting gas temperature profile is shown in FIG. 2.

Figure 2:
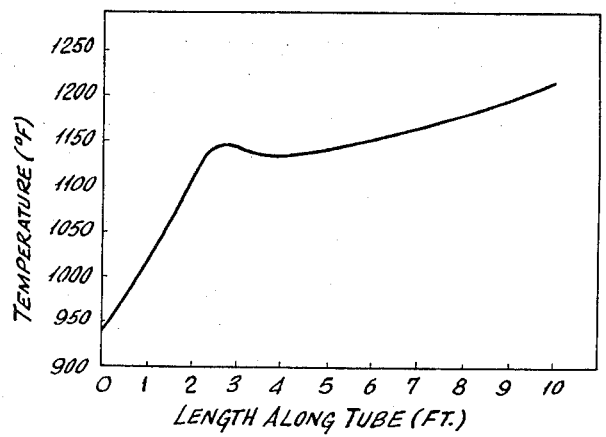
FIG. 2 is a gas temperature profile of a typical steam reforming process.

Referring to FIG. 2, it can be seen that about 2½ feet down the tube the process temperature abruptly levels off at about 1,150°F. This leveling off indicates a start of an endothermic reforming reaction. From this point the gas temperature again rises but at a slower rate than before. The temperature profile indicates that the initial 2½ feet of the catalyst was not active and that the transition from inactive to active catalyst occurs at about 2½ feet into the catalyst bed.

Additionally, visual examination of catalyst beds which had been inactivated by coking also demonstrated that coking begins at a region within the bed where the catalyst is first activated, i.e., first reaches activation temperature. Moreover, once coking is initiated, it proceeds through the catalyst bed to the reactor outlet.

As stated previously, in the practice of the present invention it is essential that electrode 17 extend into the region of incipient coking. In accordance with a preferred embodiment of the present invention, however, the conductance of about the first 2½l feet of active catalyst is monitored, thereby providing a desirable degree of flexibility. For example, when reforming catalyst is activated in the field there is no ready facility for obtaining direct process temperature profiles. Thus, the exact position of the zone of incipient coking under commercial processing conditions is uncertain. Nonetheless, it was determined in a series of steam reforming runs that the activation temperature is reached at a distance generally not greater than about 3 feet within the bed. By measuring the conductance of about 5 feet of catalyst bed as measured from the reactor inlet (about 2½ feet of inactive catalyst and about 2½ feet of active catalyst) exact determination of the region of incipient coking can be avoided.

Consequently, for a typically steam reforming process wherein the catalyst is activated in situ, the electrode 17 is arranged axially within reactor 32 so as to extend about 5 feet into catalyst bed 34 from the inlet side of the bed. During the chemical process, an electrical potential is continuously applied across the catalyst between reactor 32 and electrode 17. By measuring the current across the bed any change in the conductivity of the catalyst is detected. Conductivity, of course, is the reciprocal of electrical resistance. Typically, the catalyst initially shows high electrical resistance, i.e., low conductivity. Increased conductivity is an indication of coking and process conditions can be adjusted immediately to prevent further carbon deposits from forming on the catalyst and to remove those already formed.

Using the method of this invention in numerous steam reforming tests, coke formation was detected in sufficient time to allow adjustment of the steam to carbon ratios thereby prolonging the life of the catalyst. In a typical run, process conditions were as follows:

| | |
|---|---|
| Inlet Temperature | 925°F. |
| Outlet Temperature | 1301°F. |
| Outlet Pressure | 350 psig. |
| Steam/Carbon | 2.0/l |
| Mass Velocity | 1.80 lbm/ft²sec |

The reactor was a 3⅛ inch I.D. stainless steel tube partially filled with ⅝ inch Raschig rings of a commercial nickel alumina steam reforming catalyst containing about 25% nickel. The length of the catalyst charge in the reactor tube was about 10 feet long.

The hydrocarbon feed was propane and the gaseous products consisted principally of hydrogen, carbon monoxide, carbon dioxide and small amounts of methane.

A potential of 5 volts was continuously applied across the catalyst in the first 5 feet of the bed. The initial conductance of the catalyst under steady state conditions was $20 \times 10^{-6}$ mho. After about 40 minutes from the start of the reaction, the conductance of the catalyst increased to the order of about $200 \times 10^{-6}$ mho, indicating formation of coke on the catalyst in the region of incipient coking. The process was allowed to continue undisturbed until the conductance of $700 \times 10^{-6}$ mho was indicated. At this point, the propane feed was decreased to provide a steam to carbon ratio of 3:1. Shortly thereafter, the propane feed was again decreased to provide a steam to carbon ratio of 5:1. Finally the hydrocarbon feed was halted altogether and the conductivity fell to $40 \times 10^{-6}$ mho in about 2 minutes. At this point the catalyst was completely decoked. Consequently, propane was again introduced into the reactor at a steam to carbon ratio of 5:1. After a steady state was achieved, conductance recovered to the initial value of $20 \times 10^{-6}$ mho.

In above test run, the catalyst was subjected to seven additional coke and decoking cycles. Subsequently, the catalyst was removed for examination and there was no indication of catalyst deterioration or any evidence of carbon on the catalyst.

What is claimed is:

1. In processes involving reactions of carbonaceous materials in the presence of a bed of catalyst wherein said catalyst is activated at some point within the bed and wherein coke is formed in the bed of catalyst and the coke formed is detected by reference to changes in the conductivity of the catalyst bed, the improvement comprising measuring changes in conductivity of said catalyst bed only over an area within the bed sufficient to encompass the point where the catalyst is first activated.

2. The method of claim 1 wherein the conductivity of the catalyst is measured only over a distance of about 2½ feet from the point where the catalyst is first activated.

3. The method of claim 2 wherein changes in the conductivity of the catalyst are measured by applying an electric potential between an electrode extending axially into the bed from the inlet side and an electrically conductive reactor tube containing the catalyst bed.

4. The method of claim 1 wherein the process monitored is a catalytic steam reforming process.

5. A method of controlling catalytic chemical process to present and remove coke deposits on the main bed of catalyst comprising:
   a. continually imposing an electrical potential across said bed of catalyst only over an area sufficient to encompass the point in the bed of catalyst where the catalyst is first at activated temperatures;
   b. ascertaining changes in the conductivity of said catalyst in said area;
   c. adjusting said chemical process in response to said change in conductivity whereby prevention and removal of coke deposits on said catalyst is accomplished.

6. The method of claim 5 wherein said area encompasses a zone of inactive catalyst bordering on a zone of active catalyst.

7. The method of claim 5 wherein said chemical process is steam reforming.

8. The method of claim 5 wherein said chemical process is town gas manufacture.

9. The method of claim 5 wherein said chemical process is synthesis gas production.

* * * * *

UNITED STATES PATENT OFFICE
CERTIFICATE OF CORRECTION

Patent No. 3,864,083  Dated February 4, 1975

Inventor(s) Norman W. Green and Richard W. Dunning

It is certified that error appears in the above-identified patent and that said Letters Patent are hereby corrected as shown below:

On page 1, after "Lake Hiawatha;" please insert --Richard W. Dunning, Piscataway, both of N.J.--

Signed and sealed this 15th day of April 1975.

(SEAL)
Attest:

RUTH C. MASON
Attesting Officer

C. MARSHALL DANN
Commissioner of Patents
and Trademarks